US011766986B2

(12) United States Patent
Byun et al.

(10) Patent No.: US 11,766,986 B2
(45) Date of Patent: Sep. 26, 2023

(54) FAR-SIDE AIRBAG

(71) Applicant: Autoliv Development AB, Vargarda (SE)

(72) Inventors: Jong-Ki Byun, Seoul (KR); Tae-Ik Gwon, Gongju-Si (KR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/058,468

(22) PCT Filed: Jun. 26, 2018

(86) PCT No.: PCT/KR2018/007203
§ 371 (c)(1),
(2) Date: Nov. 24, 2020

(87) PCT Pub. No.: WO2020/004679
PCT Pub. Date: Jan. 2, 2020

(65) Prior Publication Data
US 2021/0197753 A1    Jul. 1, 2021

(51) Int. Cl.
*B60R 21/2338* (2011.01)
*B60R 21/231* (2011.01)

(52) U.S. Cl.
CPC .... *B60R 21/2338* (2013.01); *B60R 21/23138* (2013.01); *B60R 2021/23146* (2013.01); *B60R 2021/23386* (2013.01)

(58) Field of Classification Search
CPC .......... B60R 21/2338; B60R 21/23138; B60R 2021/23146; B60R 2021/23386; B60R 21/231
See application file for complete search history.

(56) References Cited

U.S. PATENT DOCUMENTS

| 5,806,881 | A  | * | 9/1998 | Richter | ................. | B60R 21/231 280/730.2 |
| 8,622,417 | B1 | * | 1/2014 | Schneider | ............. | B60R 21/231 280/743.2 |
| 9,016,718 | B2 | * | 4/2015 | Fukawatase | .......... | B60R 21/233 280/730.2 |
| 9,533,648 | B2 | * | 1/2017 | Fujiwara | ............... | B60R 21/207 |
| 9,663,061 | B2 |   | 5/2017 | Mihm | | |

(Continued)

FOREIGN PATENT DOCUMENTS

| JP | 2008-001197 A | 1/2009 |
| JP | 4879661 B2 | 2/2012 |

(Continued)

*Primary Examiner* — James M Dolak
*Assistant Examiner* — Joselynn Y Sliteris
(74) *Attorney, Agent, or Firm* — Harness, Dickey & Pierce, P.L.C.; Stephen T. Olson

(57) ABSTRACT

Disclosed is a far-side airbag. Each section of the far-side airbag introduced in the present specification deploys in a different direction. That is, the far-side airbag introduced in the present specification comprises: a first inflation section that deploys in a reference direction; and a second inflation section that is connected to the first inflation section and deploys in a direction inclined by a set angle from the reference direction. This far-side airbag manufactured in such a configuration sufficiently supports occupants and does not rotate, and can thus safely protect the occupants.

15 Claims, 13 Drawing Sheets

(56) References Cited

U.S. PATENT DOCUMENTS

| | | | | |
|---|---|---|---|---|
| 10,023,147 B2* | 7/2018 | Kwon | ............... | B60R 21/23138 |
| 10,300,878 B2* | 5/2019 | Park | ................... | B60R 21/2338 |
| 10,486,635 B2* | 11/2019 | Karlow | ................. | B60R 21/207 |
| 10,486,638 B2* | 11/2019 | Kwon | ............... | B60R 21/23138 |
| 10,543,800 B2* | 1/2020 | Kwon | .................. | B60R 21/207 |
| 10,543,801 B2* | 1/2020 | Kwon | .................. | B60R 21/2338 |
| 10,864,881 B2* | 12/2020 | Park | ................. | B60R 21/23138 |
| 10,870,405 B2* | 12/2020 | Kwon | ................ | B60R 21/23138 |
| 11,014,521 B2* | 5/2021 | Steiner | ................. | B60R 21/233 |
| 11,230,250 B2* | 1/2022 | Sturm | ................... | B60R 21/207 |
| 2015/0314748 A1 | 11/2015 | Mihm | | |
| 2019/0283700 A1* | 9/2019 | Kwon | ............... | B60R 21/23138 |
| 2019/0375362 A1* | 12/2019 | Steiner | ................ | B60R 21/207 |
| 2021/0031717 A1* | 2/2021 | Fuma | ............... | B60R 21/23138 |
| 2021/0170978 A1* | 6/2021 | Acker | .................. | B60R 21/233 |

FOREIGN PATENT DOCUMENTS

| | | | |
|---|---|---|---|
| JP | 2014-108740 A | | 6/2014 |
| KR | 10-2004-0024278 A | | 3/2004 |
| KR | 10-2015-0087425 A | | 7/2015 |
| KR | 10-1691959 B1 | | 1/2017 |
| KR | 10-2017-0051824 A | | 5/2017 |
| KR | 1020170051824 A | * | 5/2017 |
| KR | 10-1781387 B1 | | 9/2017 |
| KR | 10-2017-0131129 A | | 11/2017 |
| KR | 10-1916007 B1 | | 11/2018 |
| WO | WO-2019193082 A1 | * | 10/2019 ........... B60R 21/207 |

* cited by examiner

FAR-SIDE AIRBAG

TECHNICAL FIELD

The present technology relates to a far-side airbag.

In particular, the present technology relates to a far-side airbag which is configured to include a section that deploys in a reference direction and a section that deploys in a direction inclined by a set angle from the reference deployment direction, and can thus safely protect occupants.

BACKGROUND ART

The car industry is one of the industries that are still continuously developing.

Recently, cars are developing in various directions of reducing exhaust fumes for the purpose of being eco-friendly, increasing stable ride comfort, developing performance of cars by enhancing engine efficiency, realizing autonomous driving, etc., and from among these, protecting occupants in accidents is most important.

An airbag which is a device for protecting occupants is typically a frontal airbag which is inflated on a front surface of a vehicle, a curtain airbag which is inflated on an outer side of a vehicle, and a far-side airbag which is inflated between a driver driving a vehicle and a passenger sitting in a passenger seat beside the driver.

A car accident raises various possibilities, and a driver may unconsciously turn a steering wheel in one direction right before collision when a car accident occurs, and accordingly, the car is more likely to collide broadside rather than colliding head-on. Accordingly, an airbag that deploys in a different direction is important, but recently, the importance of a far-side airbag which deploys between seats is being emphasized.

The far-side airbag deploys between seats, that is, between occupants (the driver and the passenger described above) to reduce an impact applied to the occupants and to prevent the occupants from being thrown out the car by the impact. In addition, the far-side airbag may prevent the occupants of the car from colliding with each other.

To perform the above-describe role, the far-side airbag should stably support the occupants when the occupants collide with each other, and should absorb their impact. In particular, preventing the far-side airbag from rotating by the impact when the occupant collides is of paramount importance.

However, since the far-side airbag is not supported by any structure that is to prevent the airbag from being rotated or moved, due to characteristics of a position where the airbag is installed, the far-side airbag may not sufficiently support occupants when the occupants collide, and the purpose of installation thereof may be overshadowed.

[Patent Documents]

Korean Registered Patent No. "10-1691959" "FAR-SIDE AIRBAG DEVICE"

Korean Patent Application No. "10-2015-0087425" "SIDE AIRBAG DEVICE"

DISCLOSURE OF INVENTION

Technical Problems

An object of the present invention is to provide a far-side airbag.

In particular, the present invention has been developed to solve the above-described problem, and an object of the present invention is to provide a far-side airbag which does not rotate itself by an occupant colliding therewith even when there is no structure to support, and is securely fixed, thereby stably supporting the occupant.

The technical object to be achieved by the present invention is not limited to that mentioned above, and other technical objects that are not mentioned above may be clearly understood to those skilled in the technical field to which the present invention belongs, based on the description provided below.

Solution to Problem

A far-side airbag of the present invention which is inflated between seats and protects an occupant includes: a first inflation section that deploys in a set reference direction; and a second inflation section that is connected to the first inflation section and deploys in a direction inclined by a set angle from the reference direction.

Herein, a length of the second inflation section in a transverse direction may not be at least smaller than a length of the first inflation section in the transverse direction.

The first inflation section and the second inflation section of the far-side airbag may be formed by bending a fabric having a set size on a set position and bringing sections thereof into contact with each other within a set range, and then, by connecting the sections as long as a set area.

In addition, a shape maintenance tether may be installed to maintain the shape between the first inflation section and the second inflation section, and the shape maintenance tether may have one side fixed and the other side connected with at least one of the first inflation section or the second inflation section, and the other side of the shape maintenance tether may be connected with the second inflation section to set an inclined angle between the first inflation section and the second inflation section.

Herein, the shape maintenance tether may include a fixing tether having one side fixed and the other side connected to the second inflation section to maintain a shape of the second inflation section.

In addition, the shape maintenance tether may include a connection tether having one side fixed and the other side installed on the second inflation section, and any one of one side of the fixing tether or one side of the connection tether may be fixed to a seat, and the other one may be connected to the tether fixed to the seat.

In addition, the tether of the shape maintenance tether that is fixed to the seat may be interposed between the seat and a rotation prevention bracket installed on one side of the seat.

Advantageous Effects of Invention

The far-side airbag of the present invention includes the first inflation section and the second inflation section that is inflated in a direction inclined by a set angle from an inflation direction of the first inflation section, and by allowing an occupant to collide with the airbag with a sufficient time when the occupant collides, the far-side airbag of the present invention is not rotated by collision by the occupant even when there is not structure to support, and is securely fixed and can thus stably support the occupant.

BEST MODE FOR CARRYING OUT THE INVENTION

Figure 1:
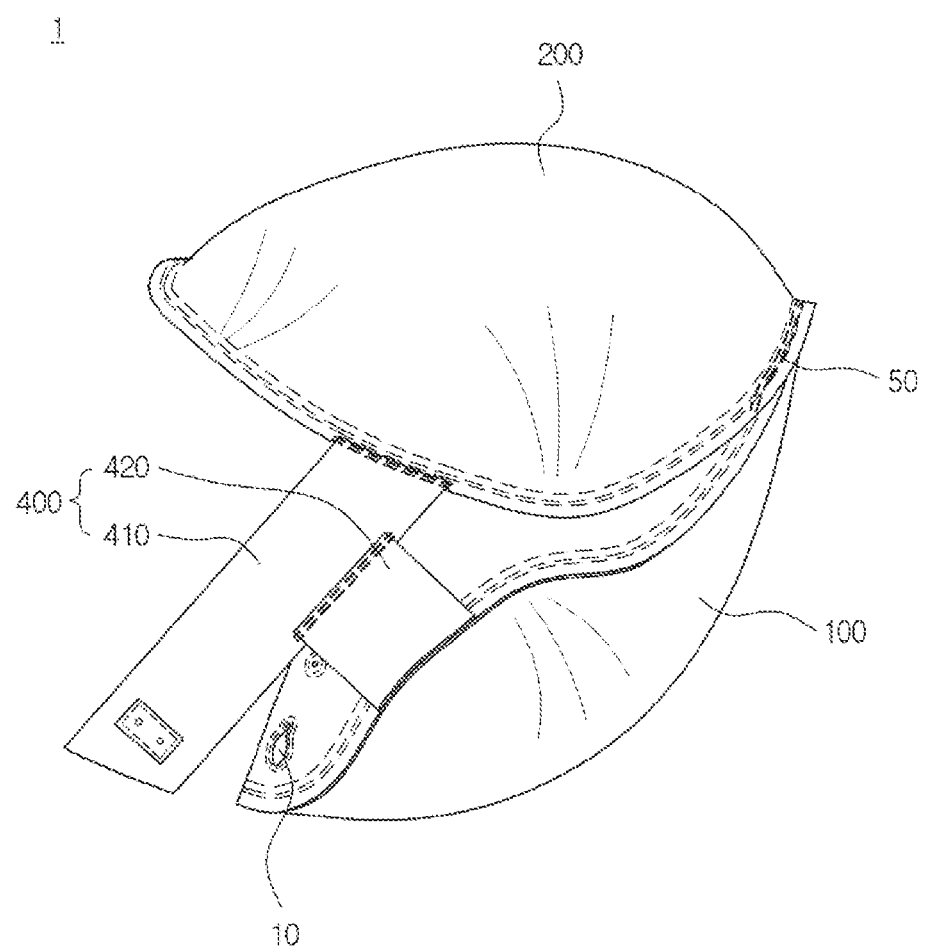
FIG. 1 illustrates a far-side airbag of the present invention.

Hereinafter, embodiments of the present invention will be described in detail with reference to exemplary drawings. However, this is not intended to limit the scope of the present invention.

In adding reference numerals to elements on the respective drawings, it should be noted that the same elements are given the same reference numerals although they are displayed on different drawings. In addition, in the description of the present invention, a related well-known constructions or functions are not described in detail since they would obscure the present invention in unnecessary detail.

In addition, sizes or shapes of elements illustrated in the drawings may be illustrated exaggeratedly for the sake of explicit explanation and convenience. In addition, the terms particularly defined considering constructions and operations of the present invention are just for explaining embodiments of the present invention, and are not intended to limit the scope of the present invention.

FIG. 1 illustrates a far-side airbag of the present invention.

The far-side airbag 1 of the present invention has a different form from a related-art airbag.

When a vehicle collides broadside, the far-side airbag 1 of the present invention comes into contact with a side surface of the chest of an occupant being thrown out the vehicle and supports the occupant for a long time, thereby protecting the occupant from an impact, and prevents the occupant from being thrown out and from colliding with other occupants.

The far-side airbag 1 of the present invention is fixed to a side surface of a seat, and deploys between seats by a control unit such as an ECU or an ACU upon collision.

The far-side airbag 1 of the present invention includes a first inflation section 100 and a second inflation section 200. In addition, it is obvious that an inflater hole 10 where an inflater is installed and a vent hole to discharge gas supplied to the inflater are formed.

The first inflation section 100 deploys in a reference direction. Herein, the reference direction is an upward direction by way of an example. More exactly, the first inflation section deploys in a direction inclined in one direction from an upper portion of the vehicle. When the first inflation section 100 is inflated, its size is enough to sufficiently cover at least the belly of an occupant.

The second inflation section 200 is connected with the first inflation section 100, and deploys in a different direction from the first inflation section 100 when it is inflated. That is, the second inflation section is inflated in a direction inclined by a set angle from the reference direction in which the first inflation section 100 is inflated. That is, as can be seen from FIG. 1, the second inflation section 200 may deploy in a direction perpendicular to the first inflation section 100. More exactly, the second inflation section 200 deploys in a direction inclined toward the occupant from the direction of the first inflation section 100 inclined in one direction from the upper side.

In addition, when the second inflation section 200 is inflated, a length of the second inflation section 200 in a transverse direction is formed at least not to be smaller than a length of the first inflation section 100 in the transverse direction.

Accordingly, when the far-side airbag 1 is inflated, the second inflation section 200 supports a side surface of the chest of the occupant.

The far-side airbag 1 of the present invention is formed in the above-described shape, such that the far-side airbag 1 has a sufficient time to support the occupant and to reduce an impact applied to the airbag itself, compared to the related-art far-side airbag 1.

In addition, to maximally prevent the airbag from being rotated by the occupant in a state where there is no support structure, the related-art far-side airbag 1 is implemented to let the far-side airbag 1 progress in a direction of supporting the airbag against rotation. Compared to this, the present invention solves the problem of the related-art far-side airbag 1 by moving an impact having nature to rotate to the first inflation section 100 positioned at a set angle with the second inflation section 200 when an occupant collides with the second inflation section 200, and by letting the first inflation section 100 support the opposite side of the second inflation section 200 moving in this way.

In addition, the far-side airbag 1 of the present invention formed with the above-described structure may utilize a sole structure for supporting the far-side airbag 1. A console box may be positioned where the far-side airbag 1 deploys, and the console box may be utilized as a support structure.

As can be seen from FIG. 1, the second inflation section 200 may transmit an impact created by an impact of the occupant moving toward a front side of a center of a vehicle in a diagonally downward direction, and transmit the impact to the first inflation section 100, and the first inflation section 100 moves down accordingly. Since the console box which is the only structure for supporting the far-side airbag 1 exists under the first inflation section, the first inflation section 100 is supported by the console box and is not rotated, and can thus safely support the occupant.

Figure 2A:
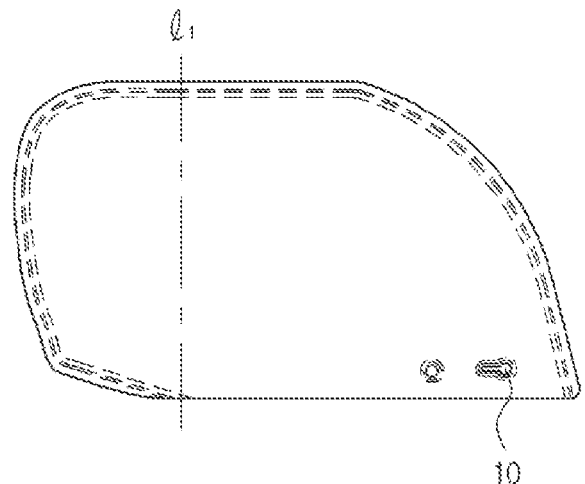
FIG. 2 illustrates a process of manufacturing the far-side airbag of the present invention according to an embodiment.
Figure 2B:
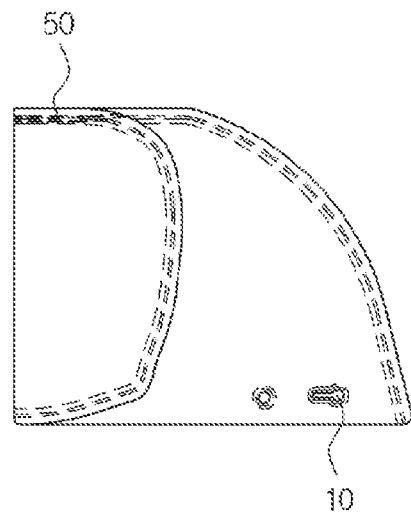
Figure 2C:
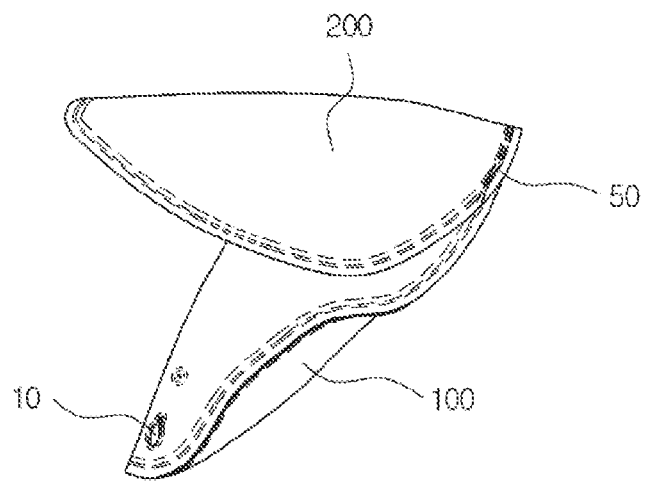

FIG. 2 illustrates a process of manufacturing the far-side airbag of the present invention according to an embodiment.

The far-side airbag 1 of the present invention may be manufactured by bending and connecting a fabric having a set size by way of an example.

Explaining the process through FIG. 2, a fabric of a set size is bent on a set position, and sections thereof are made to come into contact with each other in a set range 50. Herein, the fabric of the set size may be manufactured by connecting circumferences of a front panel and a rear panel. In another embodiment, the fabric may be manufactured by one panel, rather than by connecting separated panels.

The fabric provided in this way is divided along a virtual line L1, and the fabric is bent along the virtual line L1 and set sections are made to come into contact each other. Thereafter, only the set range 50 on the sections contacting each other is connected through a connection means.

Herein, the connection means may include various methods such as sewing, an adhesive, etc. That is, the connection is not limited to sewing as shown on the drawings, and the fabric may be connected in other methods as long as the fabric is not destroyed by explosively supplied gas.

Figure 3A:
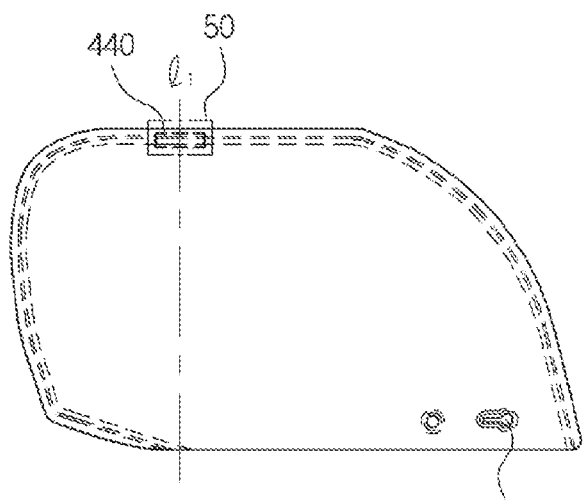
FIG. 3 illustrates a process of manufacturing the far-side airbag of the present invention according to another embodiment.
Figure 3B:
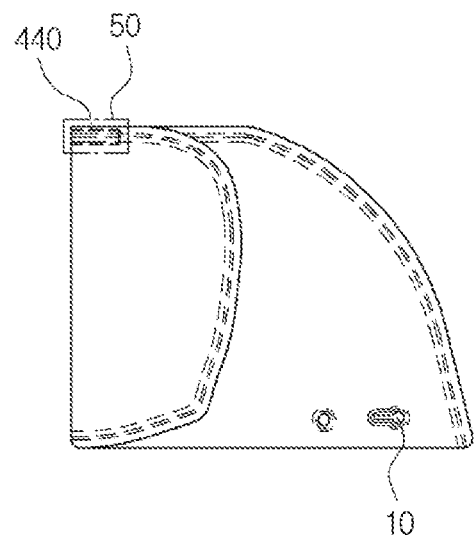
Figure 3C:
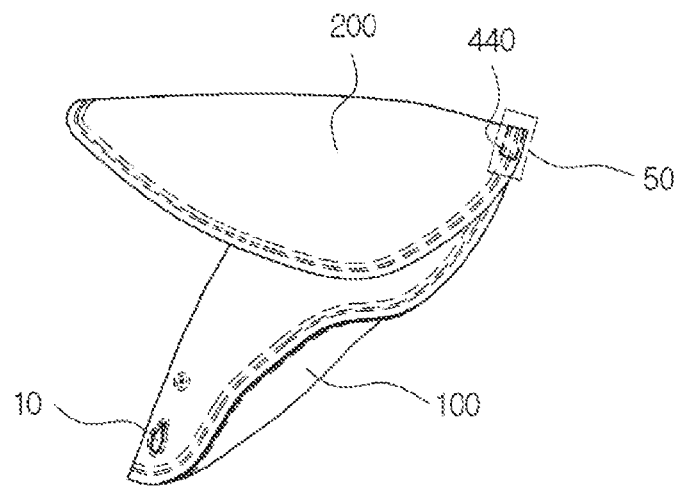

FIG. 3 illustrates a process of manufacturing the far-side airbag of the present invention according to another embodiment.

As described above, since any connection means can be used as long as the connection means of the present invention does not destroy the fabric by an impact like supply of gas, etc., and connects the set range 50 formed by bending the fabric and bringing sections into contact with each other, the fabric may be connected through a separate connection fabric 440 in addition to the above-described sewing.

The far-side airbag manufacturing method according to another embodiment may manufacture in the same method as the method of the above-described embodiment, but, in addition to the fabric which is a base for manufacturing, the connection fabric 400 serves as a connection means, and accordingly, there is a difference in the set range 50.

That is, the set range 50 in the method for manufacturing the far-side airbag according to another embodiment may be set to be smaller than the set range 50 set to manufacture the far-side airbag according to the above-described embodiment. The connection fabric 400 may be spread as long as its original length, but is not spread longer than that, and, when the second inflation section 200 is inflated, the second inflation section 200 makes the first inflation section 100 be inflated in an inclined state from the inflation direction, and may maintain the inclined state.

When the airbag is manufactured through the above-described method, a dedicated fabric to which a different configuration from the related-art airbag is added is not required to be manufactured, and the far-side airbag 1 including the first inflation section 100 and the second inflation section 200 can be manufactured in a simple method.

Figure 4:
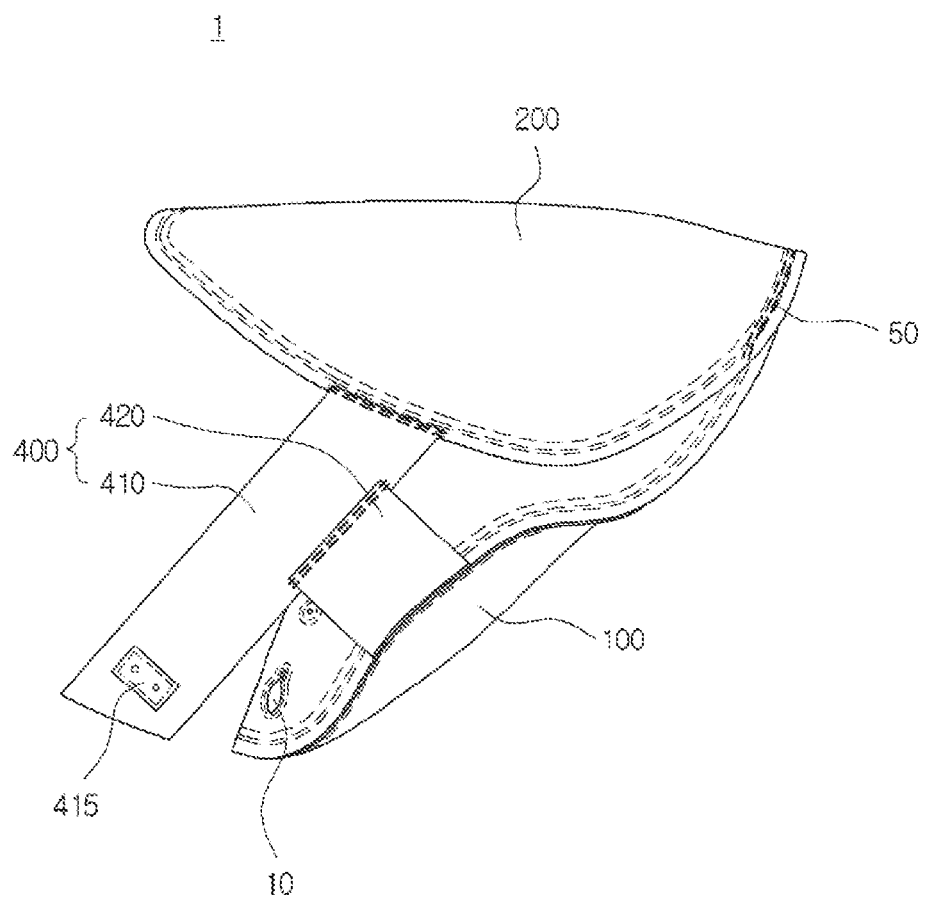
FIG. 4 illustrates a shape maintenance tether of the far-side airbag of the present invention.

FIG. 4 illustrates a shape maintenance tether of the far-side airbag of the present invention.

The far-side airbag 1 of the present invention includes a shape maintenance tether 400.

The shape maintenance tether 400 has one side fixed to the vehicle, for example, a seat, and the other side connected to at least one of the first inflation section 100 and the second inflation section 200. Herein, it is obvious that a position where the shape maintenance tether 400 is connected is spaced apart from the portion of the fabric that is bent and is connected by the connection means.

The shape maintenance tether 400 has a set length, and, when the far-side airbag 1 deploys to a position longer than the set length, the shape maintenance tether 400 maintains the shape by pulling the far-side airbag 1 to the opposite side by a fixed portion. Accordingly, the shape of the far-side airbag 1 of the present invention is maintained by preventing an angle between the first inflation section 100 and the second inflation section 200 from being larger than a set angle.

Accordingly, the second inflation section 200 is inflated toward the occupant and is made to support a side surface of the chest of the occupant.

Accordingly, when the far-side airbag 1 of the present invention deploys, the first inflation section 100 and the second inflation section 200 are controlled to be distanced from each other only by a set length, and an inclined angle between the first inflation section 100 and the second inflation section 200 may be set. Accordingly, the second inflation section 200 is made to be inflated toward the occupant, and a side surface of the second inflation section 200 is made to support a side surface of the chest of the occupant.

In addition, the shape maintenance tether 400 may serve to prevent the far-side airbag 1 of the present invention from being rotated by collision with the occupant.

Preferably, the shape maintenance tether 400 includes a fixing tether 410 and a connection tether 420.

The fixing tether 410 has one side fixed to the vehicle and the other side connected with the second inflation section 200 to control an inflation position of the second inflation section 200. Accordingly, the second inflation section 200 may have its shape maintained by the fixing tether 410.

The connection tether 420 has one side fixed to the fixing tether 410 and the other side connected to the first inflation section 100 to control an inflation position of the first inflation section 100. Accordingly, the first inflation section 100 may have its shape maintained by the connection tether 420.

In addition, the fixing tether 410 and the connection tether 420 may be connected with each other, and may be fixed to a seat. FIG. 4 illustrates that the fixing tether 410 is fixed to the seat by way of an example, and descriptions are made with reference to this, but this should not be considered as limiting.

The fixing tether 410 may be formed longer than the connection tether 420, and may have one side fixed to the seat. One side of the connection tether 420 is connected to the fixing tether 410. By connecting the connection tether 420 to the fixing tether 410 rather than to the seat through the above-described method, waste of materials for manufacturing the connection tether 420 can be prevented.

Figure 5:
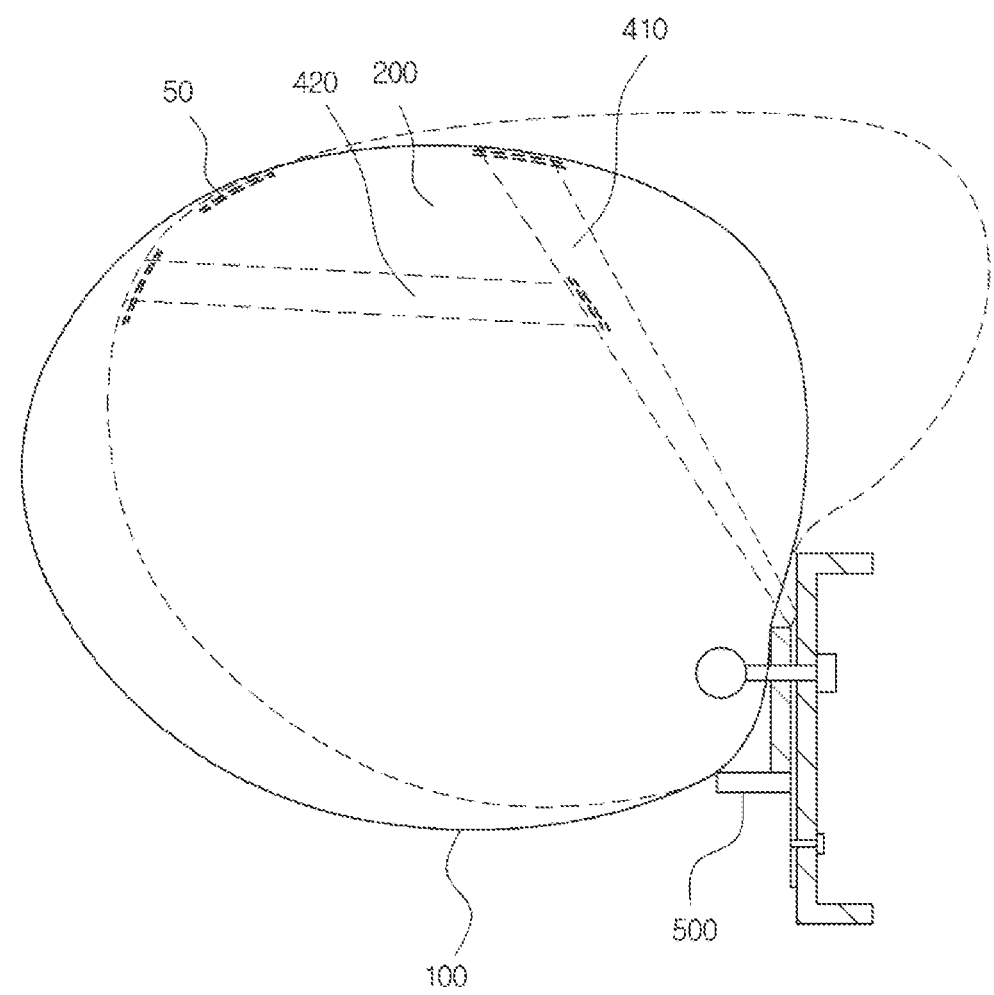
FIG. 5 illustrates the far-side airbag of the present invention being connected to a rotation prevention bracket.

FIG. 5 illustrates the far-side airbag of the present invention being connected to a rotation prevention bracket.

One side of the fixing tether 410 may be interposed between the seat and the rotation prevention bracket 500 and may be fixed.

The rotation prevention bracket 500 may be observed as being in the form of "L" in cross section. The rotation prevention bracket 500 is fixed to the seat, and a protruding portion except for the portion fixed to the seat supports the far-side airbag 1 opposite to a rotation direction.

An installation hole 415 may be formed on one side of the fixing tether 410. Herein, the fixing tether 410 has at least two installation holes 415 formed thereon to stably support the far-side airbag 1, and connection holes corresponding to the installation holes 415 are formed on the rotation prevention bracket 500, and bolts, nuts are connected to the installation holes 415 and the connection holes by way of an example, and the fixing tether 410 are fixed between the rotation prevention bracket 500 and the seat.

Figure 6:
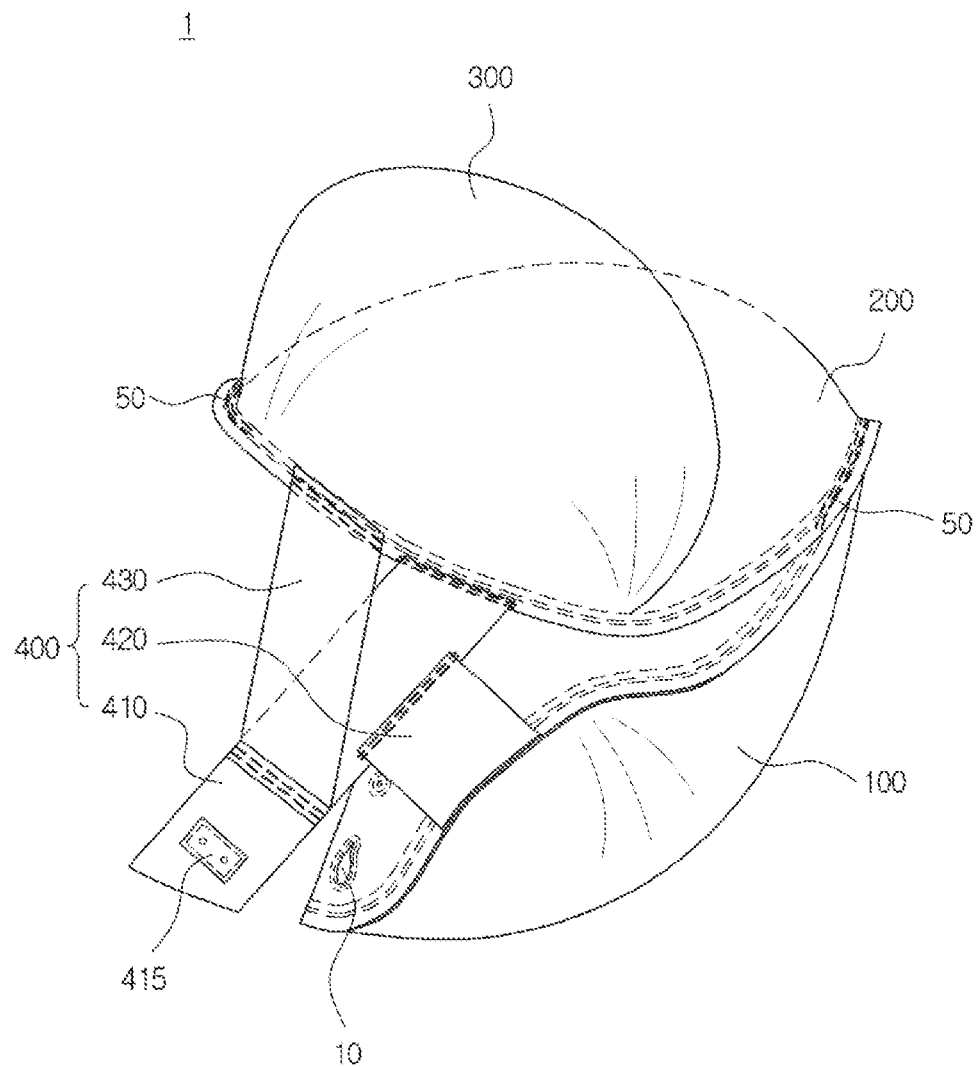
FIG. 6 illustrates a far-side airbag according to another embodiment of the present invention.

FIG. 6 illustrates a far-side airbag according to another embodiment of the present invention.

The far-side airbag 1 according to another embodiment of the present invention additionally includes a third inflation section 300. The third inflation section 300 is connected with the second inflation section 200, and deploys in a direction inclined again by a set angle from an inflation direction of the second inflation section 200.

That is, the third inflation section 300 may additionally support a side surface of the head of the occupant. Accordingly, the occupant can be more safely protected.

The third inflation section 300 deploys at the set angle with the second inflation section 200, and thus, when the head collides with the third inflation section 300, the third inflation section 300 applies a pressure in a diagonally downward direction, and the pressure is supported again by the first inflation section 100 through the second inflation section 200, so that the far-side airbag 1 according to another embodiment can stably support the occupant, and is not rotated.

Figure 7A:
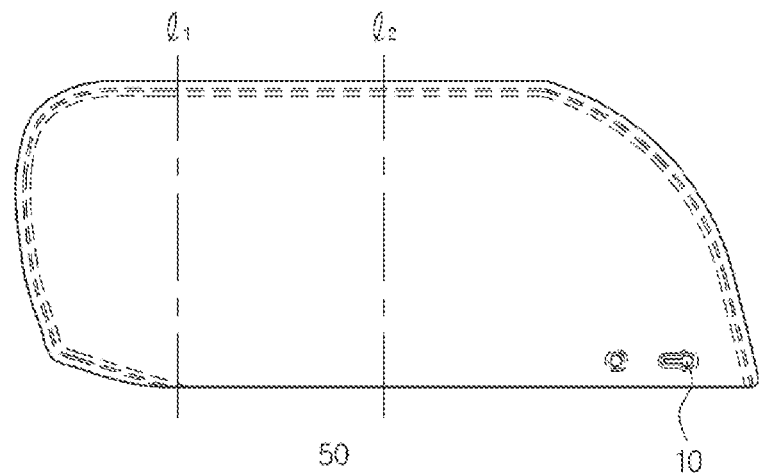
FIG. 7 illustrates an embodiment of a process of manufacturing the far-side airbag according to another embodiment of the present invention.
Figure 7B:
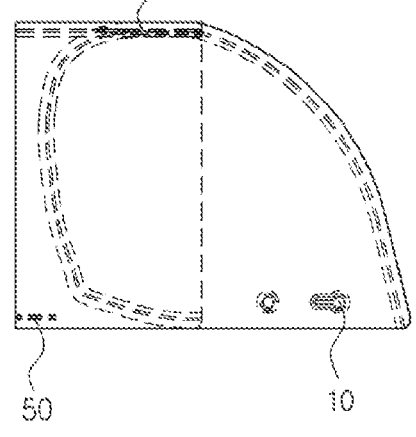
Figure 7C:
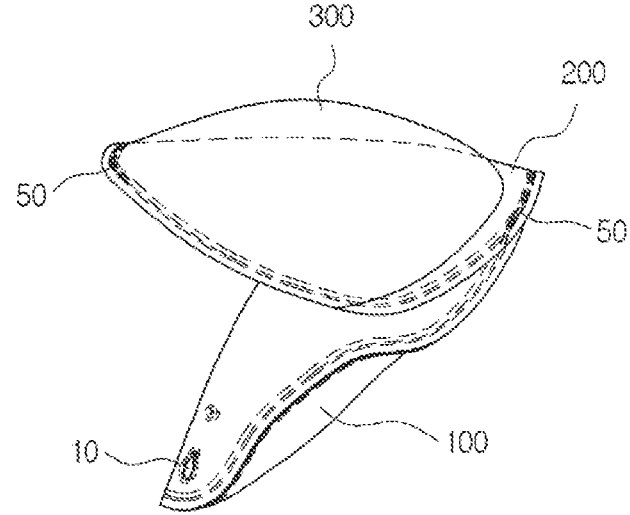

FIG. 7 illustrates an embodiment of a process of manufacturing the far-side airbag according to another embodiment of the present invention.

The third inflation section 300 may be manufacturing by bending and connecting a fabric like the second inflation section 200. Herein, a connection means for connecting the fabric is the same as described above, and thus an explanation thereof is omitted.

To manufacture the far-side airbag 1 according to another embodiment, the fabric is bent two times along a first virtual line L1 and a second virtual line L2. The fabric is bent along the first virtual line L1 and then portions of the fabric contacting each other are connected as long as the set range 50. Thereafter, the fabric is bent along the second virtual line L2, and then portions of the fabric contacting each other are connected again as long as the set range 50.

Since the far-side airbag 1 of another embodiment manufactured in the above-described method is manufactured simply by bending an existing fabric and connecting, a dedicated fabric is not required to be manufactured.

Figure 8A:
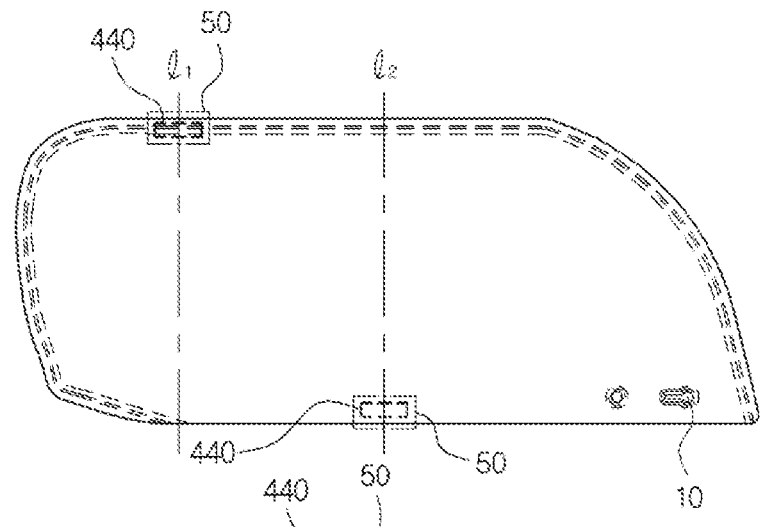
FIG. 8 illustrates a shape maintenance tether of the far-side airbag according to another embodiment of the present invention.
Figure 8B:
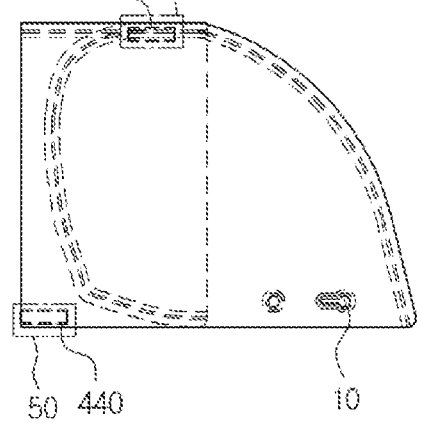
Figure 8C:
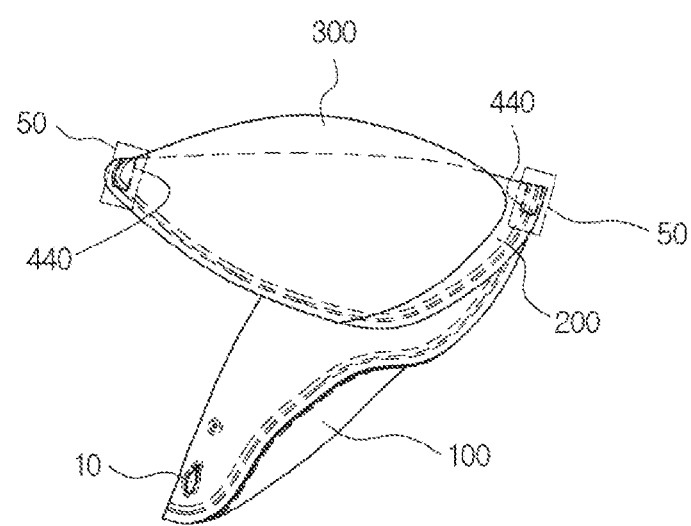

FIG. 8 illustrates another embodiment of the process of manufacturing the far-side airbag according to another embodiment of the present invention.

The process of manufacturing the far-side airbag according to another embodiment is similar to the process described through FIG. 7, but is different therefrom in that the set range 50 is connected through the connection fabric 440 as described above through FIG. 3.

In addition, when the fabric is connected through the connection fabric 440 in the same way as described through FIG. 3, a slightly smaller range than the set range 50 sewed in the process of manufacturing by sewing may be set as the set range 50.

Since the role of the connection fabric 440 is the same as described through FIG. 3, a redundant explanation thereof is omitted.

Figure 9:
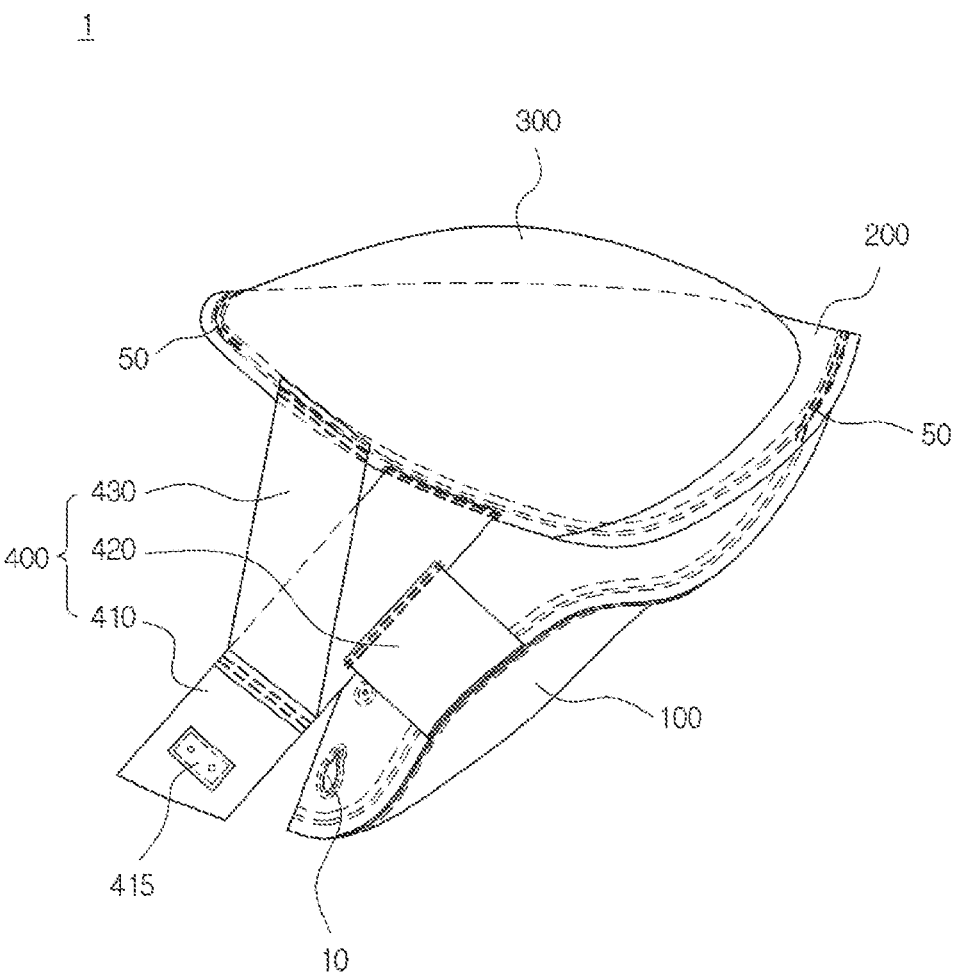
FIG. 9 illustrates the shape maintenance tether of the far-side airbag according to another embodiment of the present invention.

FIG. 9 illustrates a shape maintenance tether of a far-side airbag according to another embodiment of the present invention.

Figure 10:
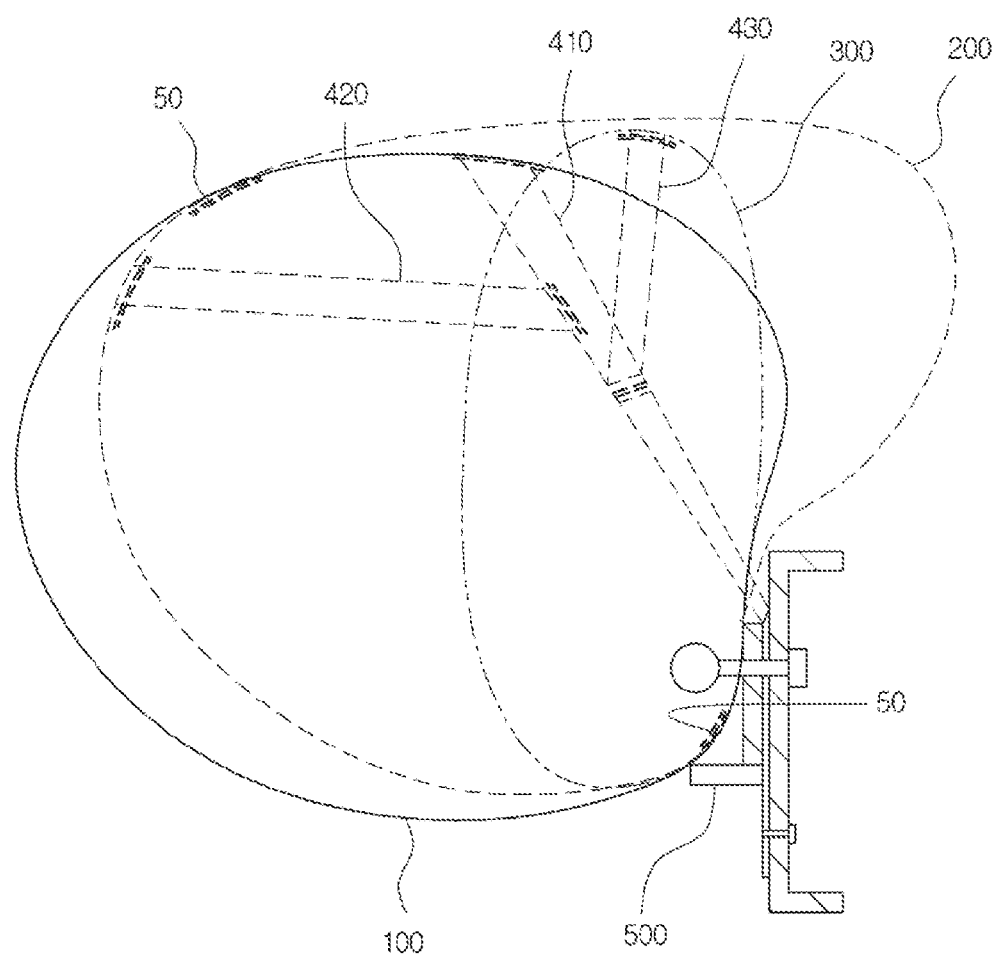
FIG. 10 illustrates the far-side airbag of another embodiment of the present invention being connected to a rotation prevention bracket.

FIG. 10 illustrates the far-side airbag being connected to the rotation prevention bracket according to another embodiment of the present invention.

The far-side airbag 1 according to still another embodiment may include an additional tether 430. The additional tether 430 may serve to control a set bending angle between the third inflation section 300 and the second inflation section 200. The additional tether 430 may have one side fixed and the other side connected with the third inflation section 300. The method of fixing the third inflation section 300 by the additional tether 430 is not much different from the method of fixing the second inflation section 200, the third inflation section 300 by the fixing tether 410, the connection tether 420 described above.

In addition, the connection tether 420 may have one side connected to the fixing tether 410 by way of an example. Of course, it is obvious that, when the connection tether 420 is formed longer than the fixing tether 410, the connection tether 420 is connected in the same way as described above.

In addition, the fixing tether 410 to which the additional tether 430 is connected may be connected to the rotation prevention bracket 500. In the same way as described above, the fixing tether 410 may be interposed between the seat and the rotation prevention bracket 500.

Figure 11A:
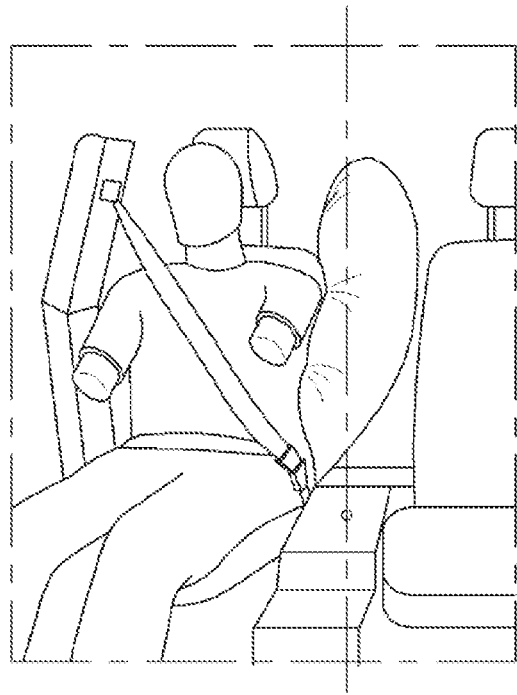
FIGS. 11A, 11B illustrate results of testing a related-art far-side airbag and the far-side airbag of the present invention under the same condition.
Figure 11B:
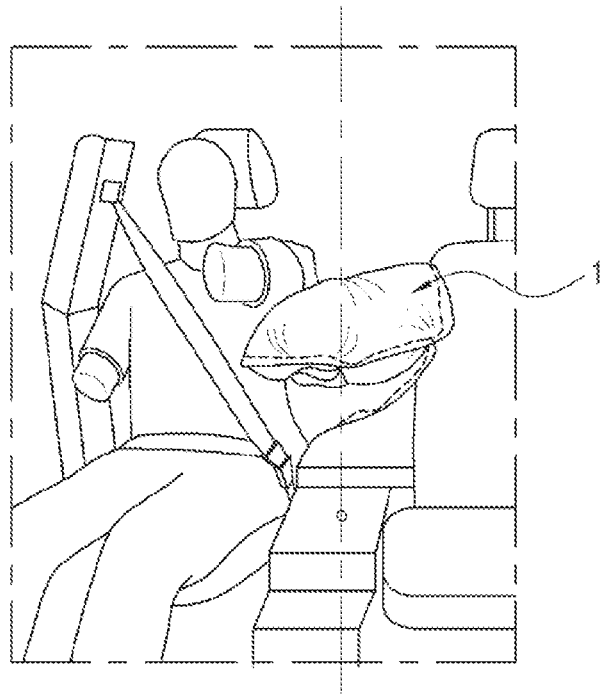

FIGS. 11A, 11B illustrate results of testing the related-art far-side airbag and the far-side airbag of the present invention under the same condition.

Figure 12A:
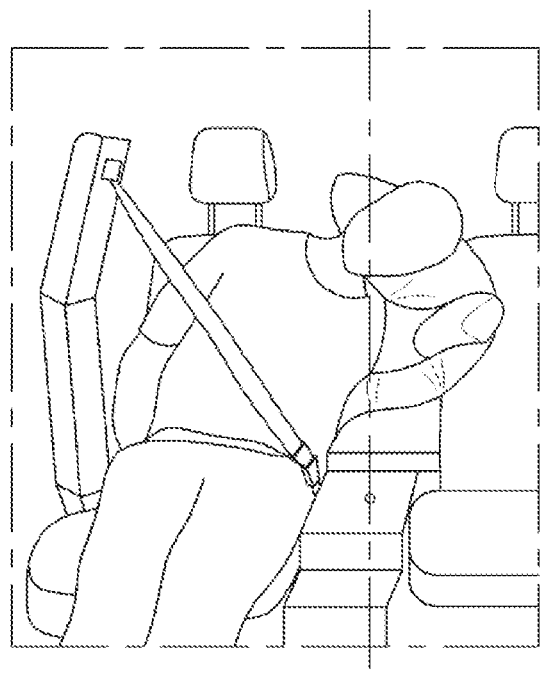
FIGS. 12A, 12B illustrate results of testing a related-art far-side airbag and the far-side airbag of the present invention under the same condition.
Figure 12B:
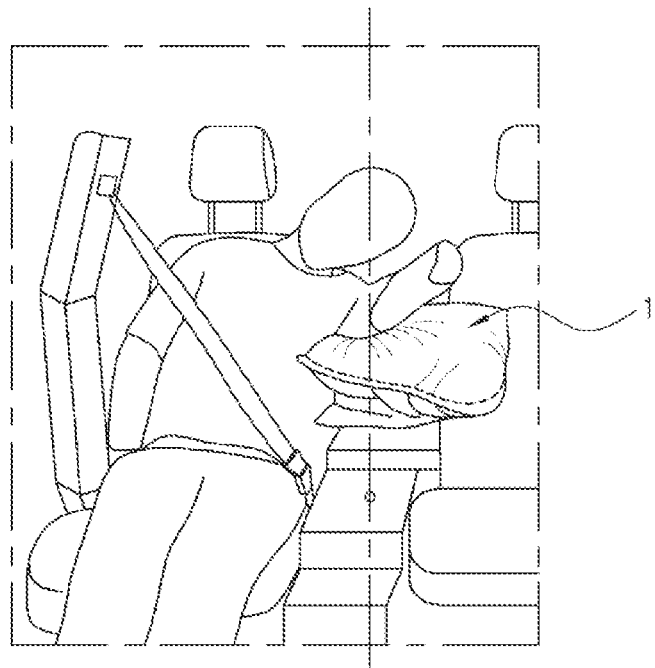

FIGS. 12A, 12B illustrate results of testing the related-art far-side airbag and the far-side airbag of the present invention under the same condition.

Figure 13A:
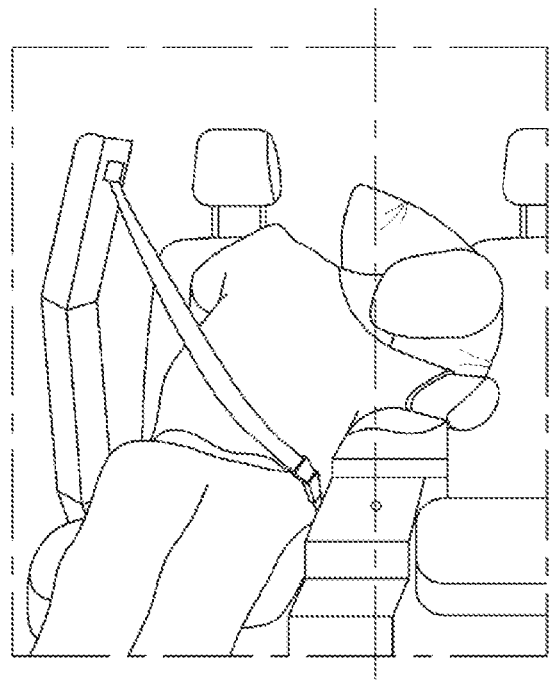
FIGS. 13A, 13B illustrate results of testing a related-art far-side airbag and the far-side airbag of the present invention under the same condition.
Figure 13B:
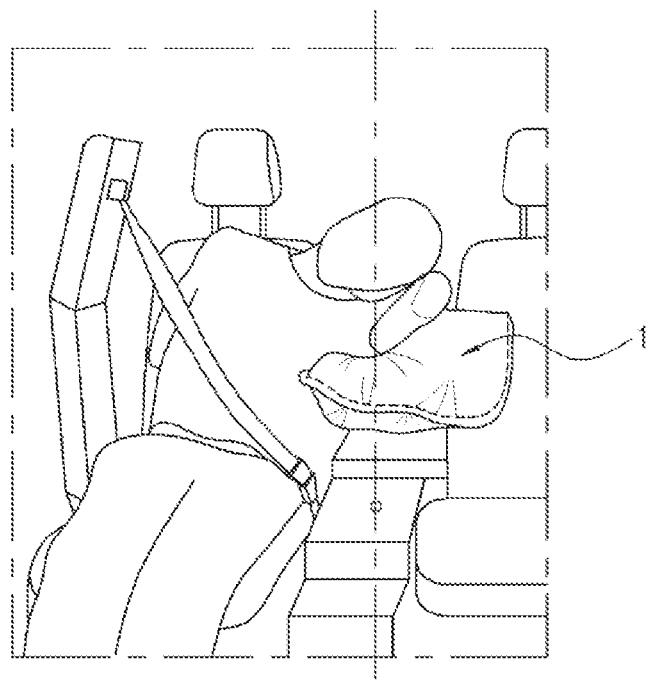

FIGS. 13A, 13B illustrate results of testing the related-art far-side airbag and the far-side airbag of the present invention under the same condition.

Through the test, the related-art far-side airbag and the far-side airbag 1 of the present invention were compared under the same condition.

Herein, FIGS. 11A, 12A, 13A illustrate the related-art far-side airbag, and FIGS. 9B, 10B, 10C illustrate the far-side airbag 1 of the present invention.

As can be seen from FIGS. 11A to 13B, when a dummy collides, the related-art far side airbag 1 is not sufficiently supported and is rotated by the collision, and therefore, the dummy is moved to the driver's seat beyond the console box. In this case, when there is a driver sitting in the driver' seat, an occupant sitting in the passenger seat may collide with the driver and may be seriously wounded.

In contrast, when the dummy collides, the far-side airbag 1 of the present invention sufficiently supports the dummy in the opposite direction and is not rotated. That is, the dummy is not moved to the driver's seat beyond the console box. Accordingly, an occupant can be protected from being thrown out and damaged, and also, the occupant sitting in the passenger seat and the occupant sitting in the driver's seat can be prevented from colliding with each other, and injuries can be prevented. That is, the original purpose of installation of the far-side airbag 1 can be achieved.

Although the present invention has been shown and described in relation with specific embodiments, it will be obvious to those skilled in the related-art that the present invention can be improved and changed variously within the scope without departing from the technical concept of the present invention provided by the claims presented below.

The invention claimed is:

1. A far-side airbag in combination with a first seat of a vehicle, the far-side airbag carried by the first seat and deployable between the first seat and a second seat of the vehicle for protecting a passenger of one of the first and second seats, the far-side airbag comprising:
   a first inflation section deployable in a first direction, the first direction being upwardly inclined and laterally away from the first seat;
   a second inflation section connected to a top of the first inflation section and deployable from the first inflation section in a second direction, the second direction being laterally toward the first seat; and at least one shape maintaining tether connecting the first inflation section and the section inflation section, a shape of the shape maintaining tether operative to set a tilt angle between the first inflation section and the second inflation section, the at least one shape maintaining tether including a fixing tether and a connection tether, a first end of the fixing tether for attachment to the vehicle, a second end of the fixing tether connecting to the second inflation section, the connection tether having a first end fixed to the fixing tether and a second end connected to the first inflation section, wherein the second inflation section overlaps the first inflation section in a vertical direction upon deployment of the far-side airbag, and wherein the first and second directions define an included angle, the included angle is an acute angle.

2. The far-side airbag of claim 1, wherein the fixing tether is interposed between the first seat and a rotation preventing bracket installed at one side of the first seat.

3. The far-side airbag of claim 1, wherein the first end of the fixing tether connects the first seat to the second inflation section.

4. The far-side airbag of claim 3, wherein the fixing tether extends upwardly and laterally away from the first seat to the second inflation section.

5. The far-side airbag of claim 4, wherein the connection tether extends upwardly and laterally toward the first seat from the first inflation section to the fixing tether.

6. The far-side airbag of claim 1, wherein the far-side airbag has a first side opposite a second side in a flat condition and the far-side airbag is folded along a virtual line such that a first side of the second inflation section comes into contact with a first side of the first inflation section upon deployment.

7. The far-side airbag of claim 1, wherein the far-side airbag has a first side opposite a second side in a flat condition and the far-side airbag is folded along a virtual line such that first and second sides of the second inflation section overlap the first inflation section upon deployment.

8. The airbag of claim 1, wherein the first inflation section is separated from the second inflation section by bending a fabric of the airbag.

9. A far-side airbag in combination with a first seat of a vehicle, the far-side airbag carried by the first seat and deployable between the first seat and a second seat of the vehicle for protecting a passenger of one of the first and second seats, the far-side airbag comprising:

a first inflation section deployable in a first direction, the first direction being upwardly inclined and laterally away from the first seat;

a second inflation section connected to a top of the first inflation section and deployable from the first inflation section in a second direction, the second direction being laterally toward the first seat; and a third inflation section connected to the second inflation section and deployable in a reset direction deflected from an inflation direction of the second inflation section, wherein the second inflation section overlaps the first inflation section in a vertical direction upon deployment of the far-side airbag, and wherein the first and second directions define an included angle, the included angle is an acute angle.

10. A far-side airbag in combination with a first seat of a vehicle, a far-side airbag carried by the first seat and deployable between the first seat and a second seat of the vehicle for protecting a passenger of one of the first and second seats, the far-side airbag comprising:

a first inflation section deployable in a first direction, the first direction being upwardly inclined and laterally away from the first seat;

a second inflation section connected to a top of the first inflation section and deployable from the first inflation section in a second direction, the second direction being laterally toward the first seat;

a first tether attached to the second inflation section for connecting the second inflation section to a vehicle structure; and a second tether indirectly connecting the first inflation section to the second inflation section through the first tether, the first and second tethers cooperating to maintain a deployed shape of the airbag, wherein the first tether is parallel to the first inflation section and the second tether is perpendicular to the first tether upon deployment of the airbag.

11. The far-side airbag of claim 10, wherein the airbag is folded along a fold line between the first inflation section and the second inflation section.

12. An airbag for deployment from a first seat of a vehicle between the first seat and a second seat of the vehicle for protecting a passenger of one of the first and second seats, the airbag comprising:

a first inflation section deployable in a first direction, the first direction being upwardly inclined; and a second inflation section connected to a top of the first inflation section and deployable from the first inflation section in a second direction, wherein the second inflation section overlaps the first inflation section in a vertical direction upon deployment of the airbag, and wherein the first and second directions define an included angle, the included angle is an acute angle, further comprising a fixer tether for connecting the second inflation section to a vehicle structure and a connecting tether connecting the first inflation section to the fixing tether, the fixing and connecting tethers cooperation to maintain a deployed shape of the airbag.

13. The airbag of claim 12, wherein the fixing tether is parallel to the fixing inflation section and the second tether is perpendicular to the first tether upon deployment of the airbag.

14. The airbag of claim 12, wherein the airbag is folded along a fold line between the first inflation section and the second inflation section.

15. The airbag of claim 12, wherein the first inflation section is separated from the second inflation section by bending a fabric of the airbag.

* * * * *